Figure 1:
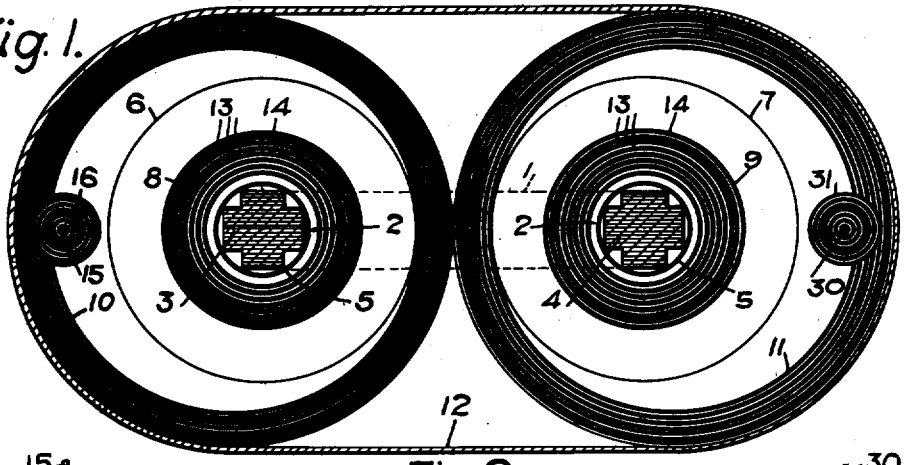

C. LE G. FORTESCUE.

TRANSFORMER.

APPLICATION FILED MAY 4, 1916.

Reissued May 21, 1918.

14,473.

12 SHEETS—SHEET 1.

WITNESSES:

R. J. Ridge.

Geo. W. Hansen

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 2.

WITNESSES:

Fred. A. Lind.

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 3.

WITNESSES:

Fred. A. Lind

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 4.

WITNESSES:

R. J. Ridge.

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 5.

WITNESSES:

F. A. Lind

Geo. W. Hansen.

INVENTOR

Charles LeG. Fortescue

BY

Oberly & Clark

ATTORNEY

C. LE G. FORTESCUE.

TRANSFORMER.

APPLICATION FILED MAY 4, 1916.

Reissued May 21, 1918.

14,473.

12 SHEETS—SHEET 6.

WITNESSES:

R. J. Fitzgerald.

Geo. W. Hansen.

INVENTOR

Charles LeG. Fortescue.

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 7.

WITNESSES:

R. J. Fitzgerald.

Geo. W. Hansen.

INVENTOR

Charles LeG. Fortescue.

BY

Uberley & Barr

ATTORNEY

C. LE G. FORTESCUE.

TRANSFORMER.

APPLICATION FILED MAY 4, 1916.

Reissued May 21, 1918.

14,473.

12 SHEETS—SHEET 8.

WITNESSES:

Fred. A. Lind.

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 9.

WITNESSES:

Fred. A. Lind

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 10.

WITNESSES:

R. J. Ridgt.

Geo. W. Hansen.

INVENTOR

Charles LeG. Fortescue

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 11.

WITNESSES:

R. J. Fitzgerald.

Geo. A. Hansen.

INVENTOR

Charles LeG. Fortescue.

BY

Wesley G. Carr

ATTORNEY

C. LE G. FORTESCUE.

TRANSFORMER.

APPLICATION FILED MAY 4, 1916.

Reissued May 21, 1918.

14,473.

12 SHEETS—SHEET 12.

WITNESSES:

R. J. Fitzgerald.

Geo. W. Hansen.

INVENTOR

Charles LeG. Fortescue.

BY

Wesley G. Carr

ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

TRANSFORMER.

14,473. Specification of Reissued Letters Patent. Reissued May 21, 1918.

Original No. 1,129,463, dated February 23, 1915, Serial No. 510,854, filed August 2, 1909. Application for reissue filed May 4, 1916. Serial No. 95,510.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Transformers, of which the following is a specification.

My invention relates to electrical apparatus and it has special reference to the windings and insulation of transformers which are adapted for use with very high-voltage circuits.

The general object of my invention is to provide such a winding and such an insulating structure that the stress exerted by the voltage of the coils shall be properly distributed through the insulation with a view to reducing the space occupied by, and the manufacturing cost of, high-voltage transformers and apparatus of this class.

My invention is applicable to all types of transformers, but it is particularly adapted for application to transformers of the core type.

The fact that the voltage which a given thickness of insulating material is capable of withstanding, is dependent, not only upon the character of the insulation, but also upon the form of the conductors or terminals which are separated by the insulation, is well known. For example, when two needle points are connected to the terminals of a high voltage circuit and are gradually brought nearer together in air or some other insulating medium, it has been observed that the distance between them when an arc is formed is materially greater than the distance between spherical terminals of relatively large radius under similar conditions. This phenomenon is due to the difference in the stress distribution in the insulating medium when the different forms of conducting terminals are used. With certain forms of terminals the stress is very much higher in those portions of the insulating medium near one or both of the terminals than in the intermediate portions which are more remote. Consequently, the insulating properties of the nearer portions are first diminished, forming a corona at the terminals, which causes an increased stress on the more remote or intermediate portion of the dielectric and results in a complete breakdown.

It is evident that when two conductors are subjected to a difference of potential, a minimum thickness of dielectric between them is required to resist any given difference of potential when their form is such that the rate of change of potential through the insulation is uniform or when the electrical potential at any point in the insulation is proportional to its distance from the terminals. These conditions exist when the conductors are in the form of parallel plates of infinite size, and are approximately when two parallel plates which are large relative to the distance between them, or when concentric hollow cylinders, of large diameters and of great length relative to the difference in their radii, are used. Under the aforesaid condition, which may be designated as the condition of uniform stress in the dielectric, no corona is produced but breakdown occurs at all parts of the dielectric simultaneously.

When a uniform stress obtains in the dielectric interposed between two charged parallel plates or two charged concentric cylinders, as mentioned above, a uniform field is established in which the electrical potential at each point in said dielectric is proportional to its distance from the charged members.

However, it is obviously impossible, in the practical construction of transformers and other electrical devices, to maintain the most desirable conditions by modifying the form of the current-conducting parts, but I have introduced means for effecting this result independently of the form of the coils or other conductors. By introducing a plurality of plates or conducting cylinders between the current-conducting parts, such as the winding of the transformed, and the nearest low-potential conducting body, such as the core member of the transformer, the insulating medium is divided into a series of relatively thin sections in each of which the proper stress distribution is obtained. By making the areas of the conducting plates, which are close to the high potential-conductor, sufficiently large, the stress in the layers of the insulation which space them apart may be materially relieved. Each succeeding conducting plate serves to so redistribute the stress that, by making the areas of the more remote conducting plates substantially equal to the areas of the adjacent plates, the insulating medium may be subjected to a substantially uniform stress throughout and therefore occupy a relatively small space, since all parts are performing their functions with maximum efficiency. There are, however, many factors which tend to disturb the equality of the distribution which would otherwise be effected and, consequently, it has been proposed to definitely fix the potential of intermediate conducting plates by severally connecting them to proper potential points in the transformer winding or some other body which is electrically charged and for which protection is desired. Some difficulties are overcome by this means, but electric disturbances are liable to be introduced, by reason of the fact that the conducting plates form a series of condensers, which, under certain conditions, rupture the insulation immediately surrounding the charged conductor.

According to my present invention, I so dispose the coils of the transformer winding and so connect them to the conductors in the insulating medium as to thoroughly and effectively insulate all of the parts, the arrangement being such, in some cases, as to produce a substantially uniform distribution of potential within the insulating medium, and in other cases, to produce a distribution similar to that which would exist if the opposing surfaces that are insulated from each other were extended infinitely, or as far as possible. The coils are spaced from the core member and from the tank or casing in accordance with their differences of potential therefrom, and the insulation and the conductors therein are so shaped, disposed and connected with reference to the coils that all of said parts cooperate to protect each other without unduly encumbering the transformer.

It will, of course, be understood that, wherever conducting cylinders or rings are herein referred to as surrounding the core legs of a transformer, interrupted cylinders or interrupted rings are meant; otherwise, the alternating flux in the core would obviously set up a short-circuited current in these parts.

My invention is illustrated in the accompanying drawings, in which—

Figure 2:
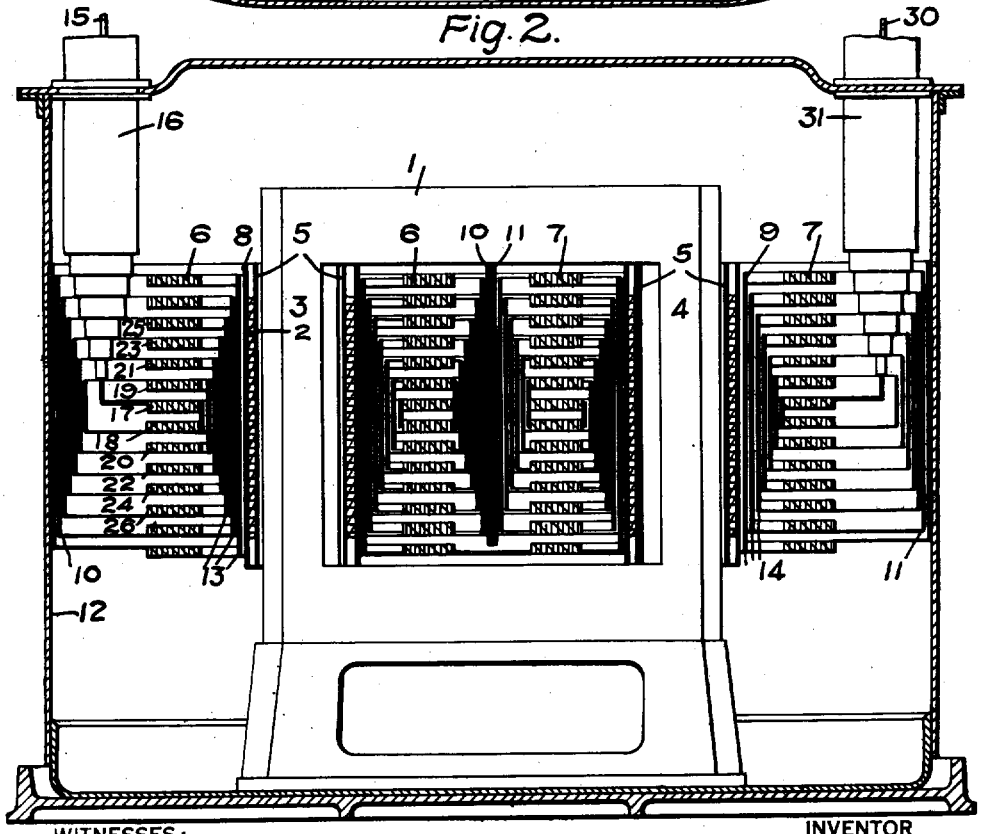
Figure 3:
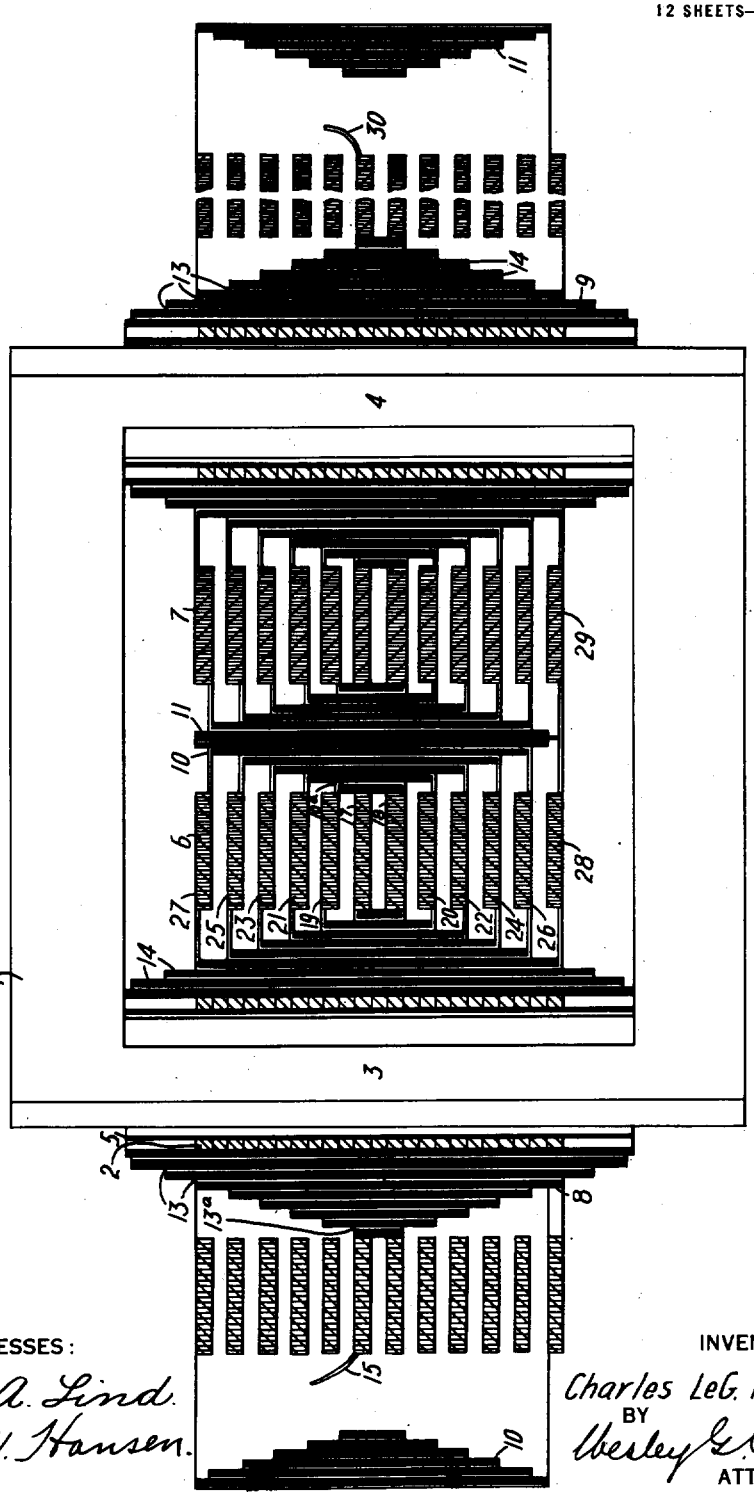
Figure 4:
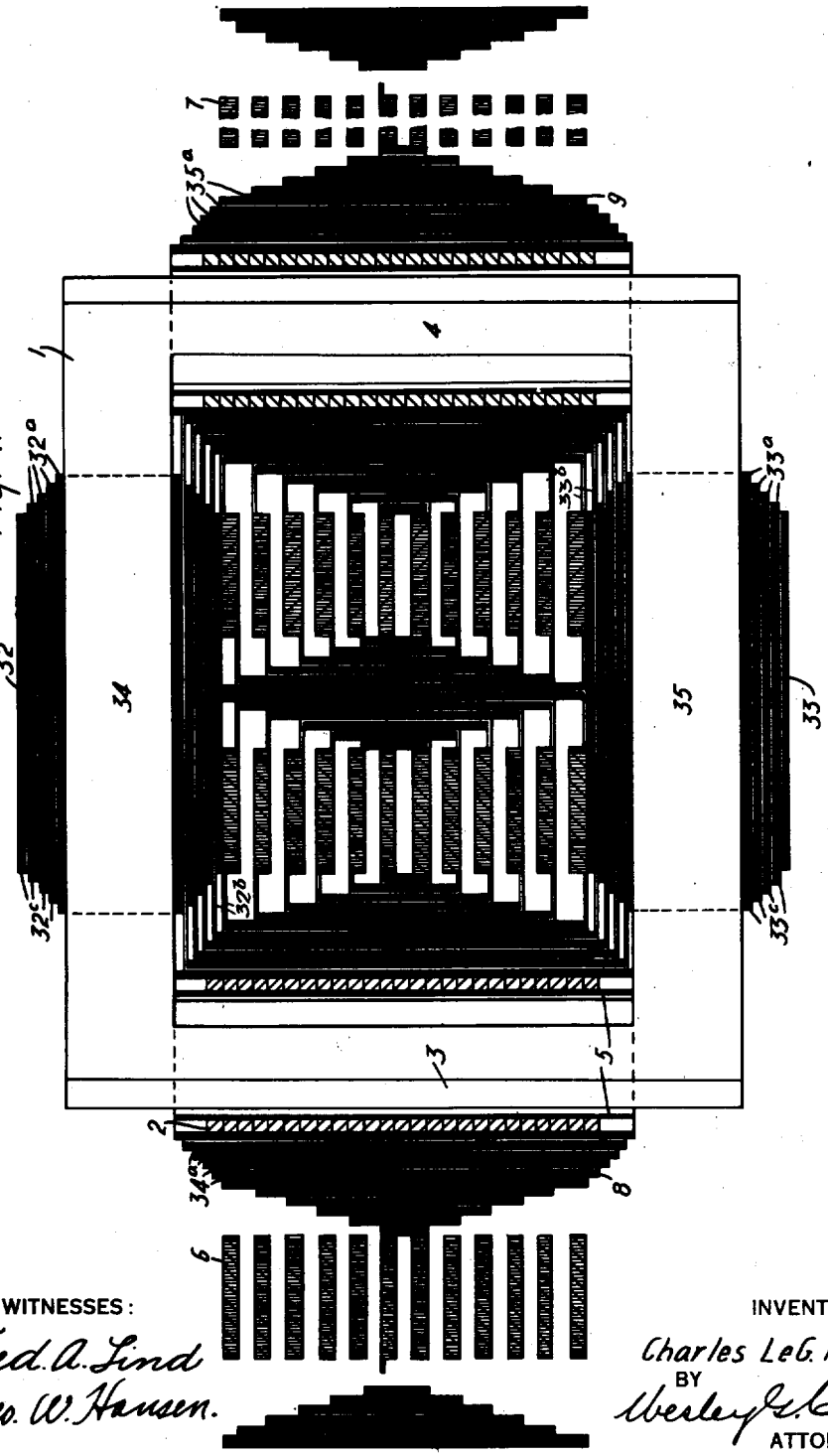
Figure 5:
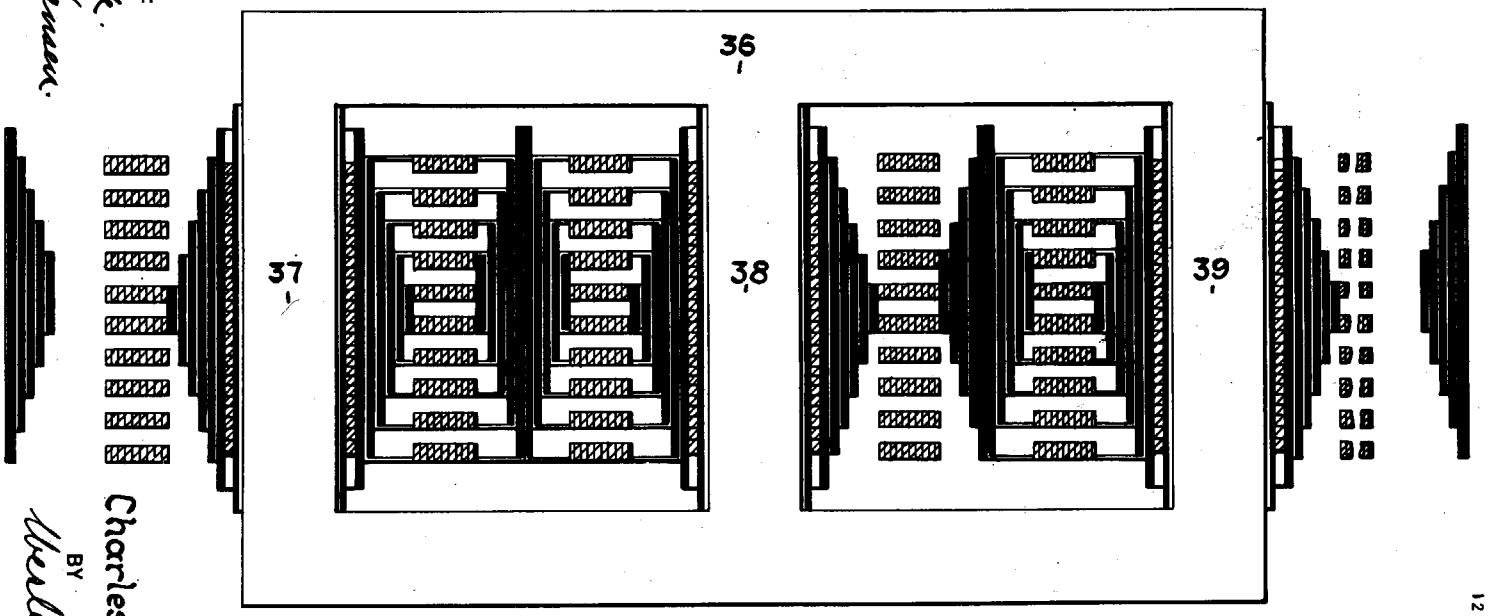
Figure 6:
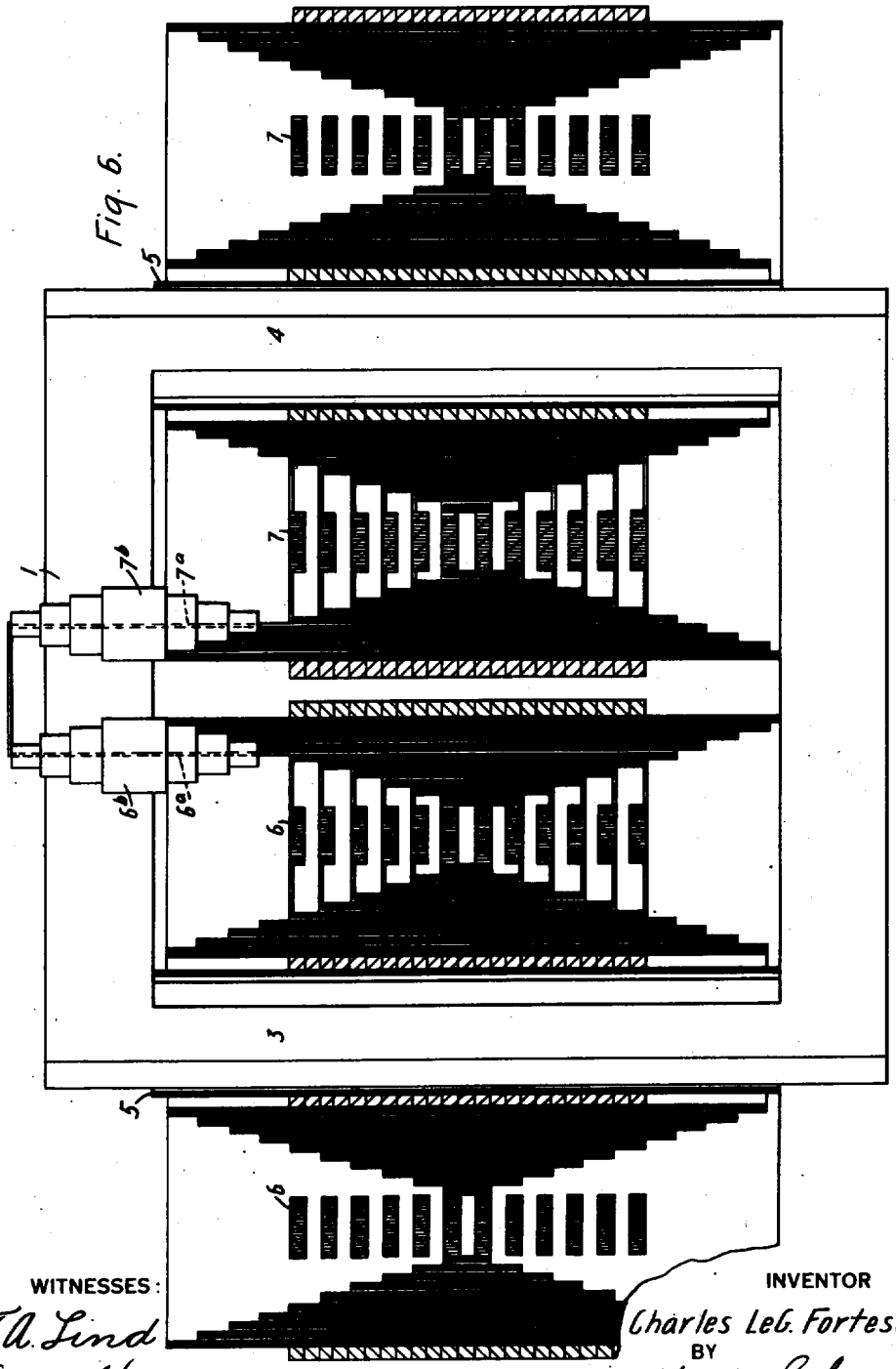
Figure 7:
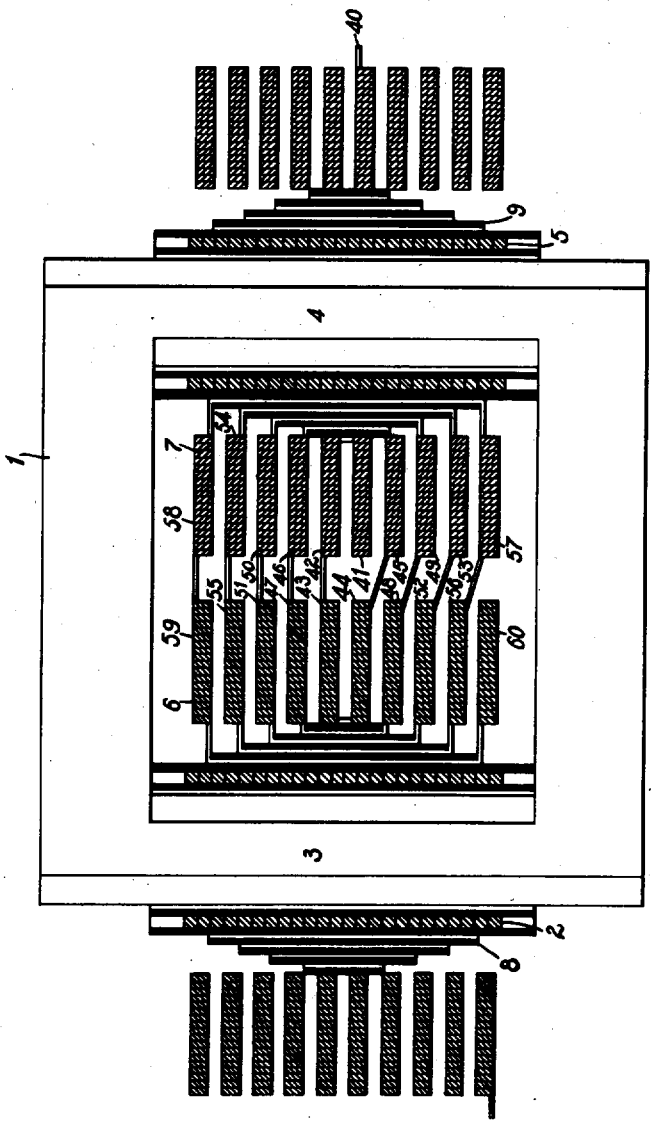
Figure 8:
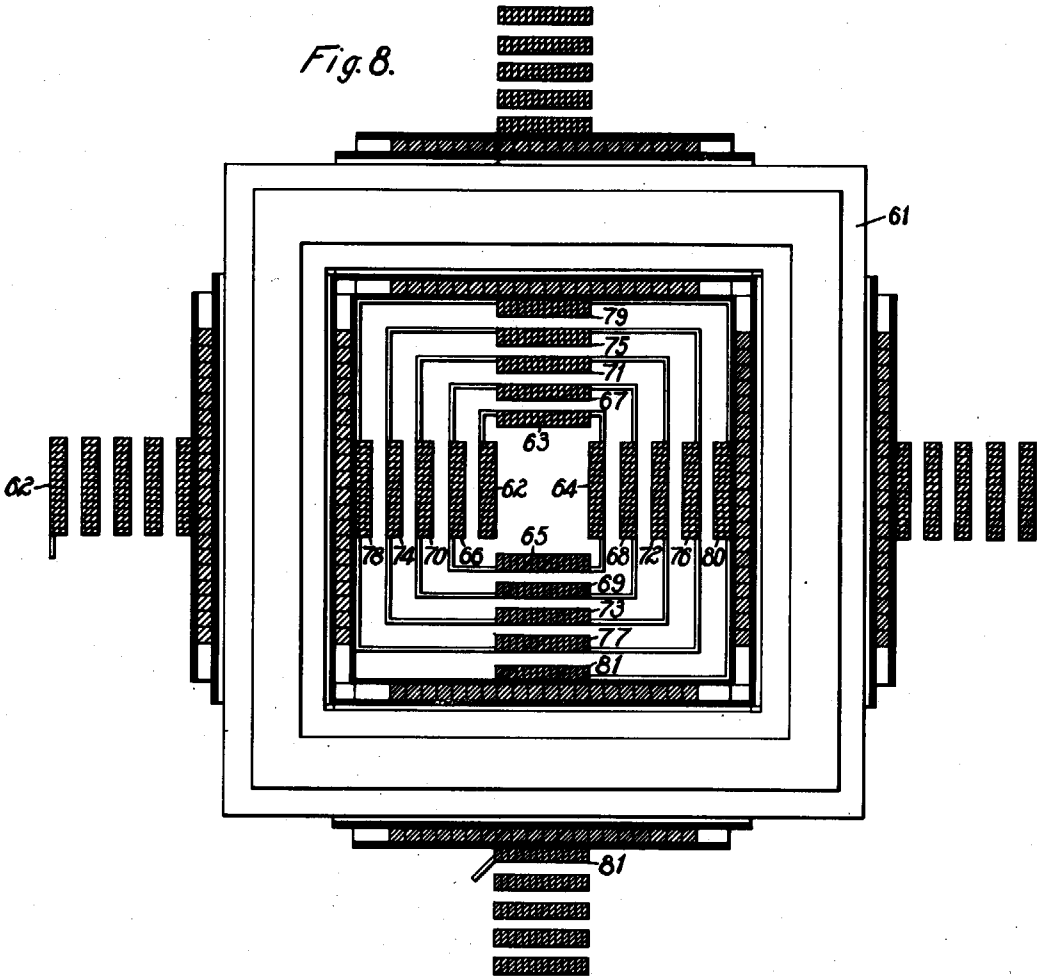
Figure 9:
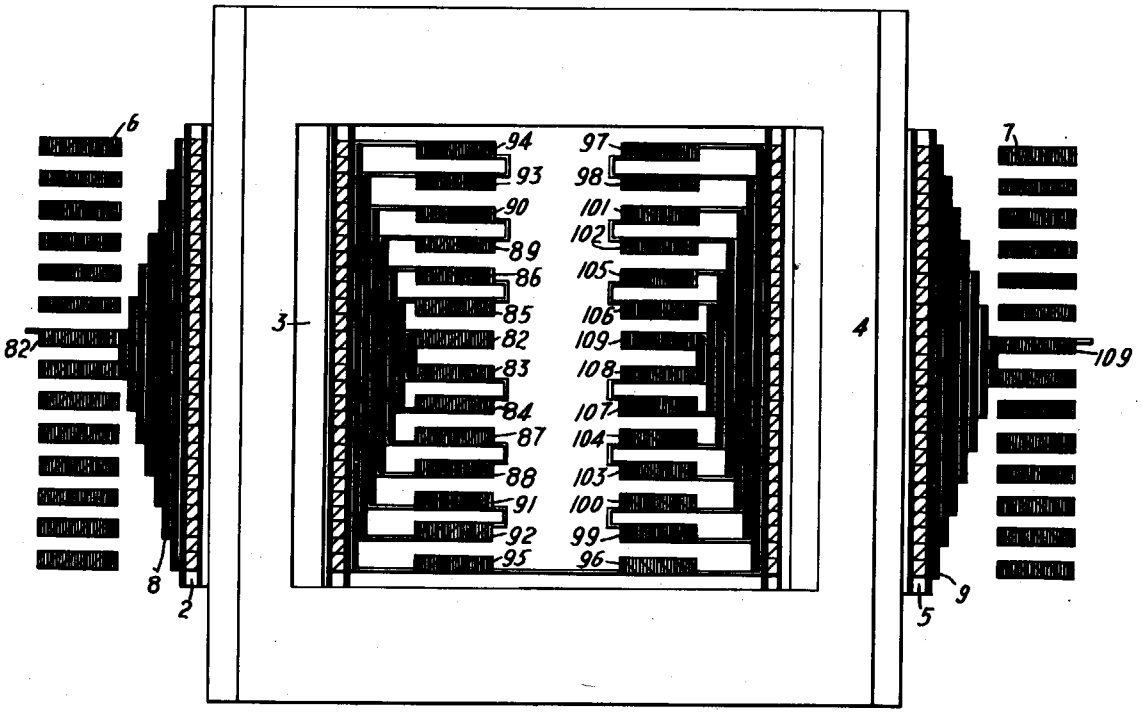
Figure 10:
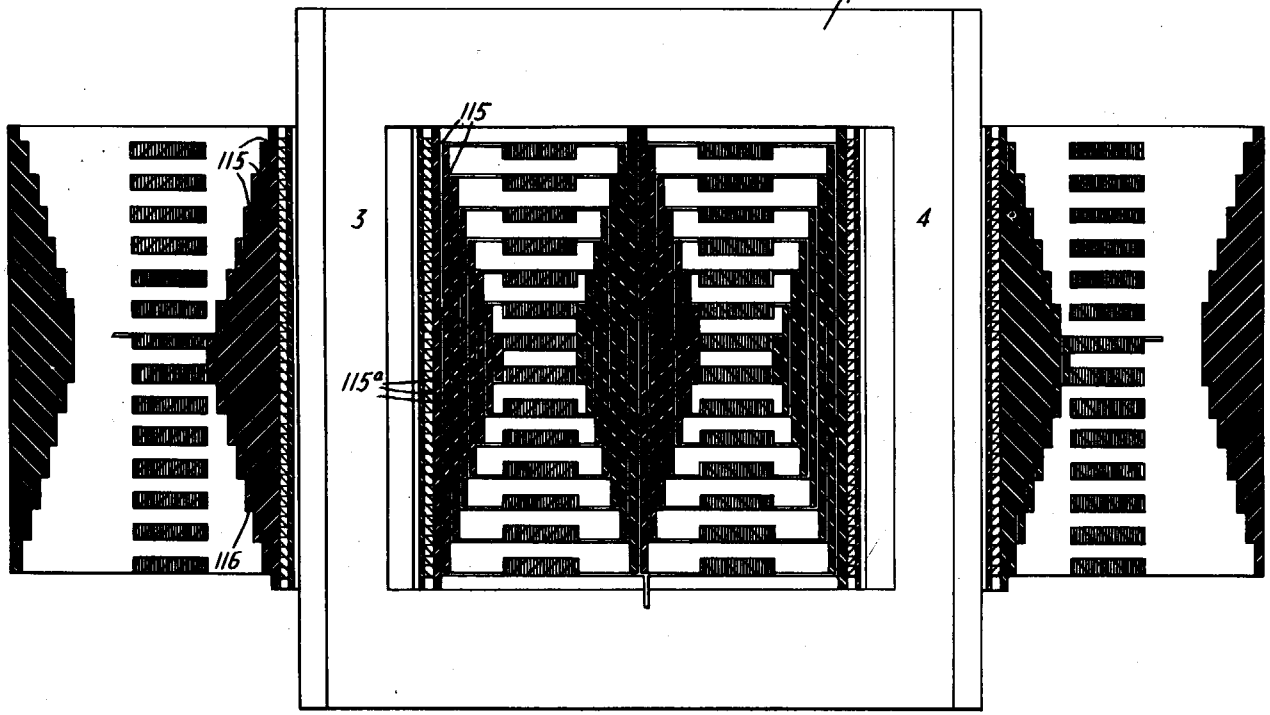
Figure 11:
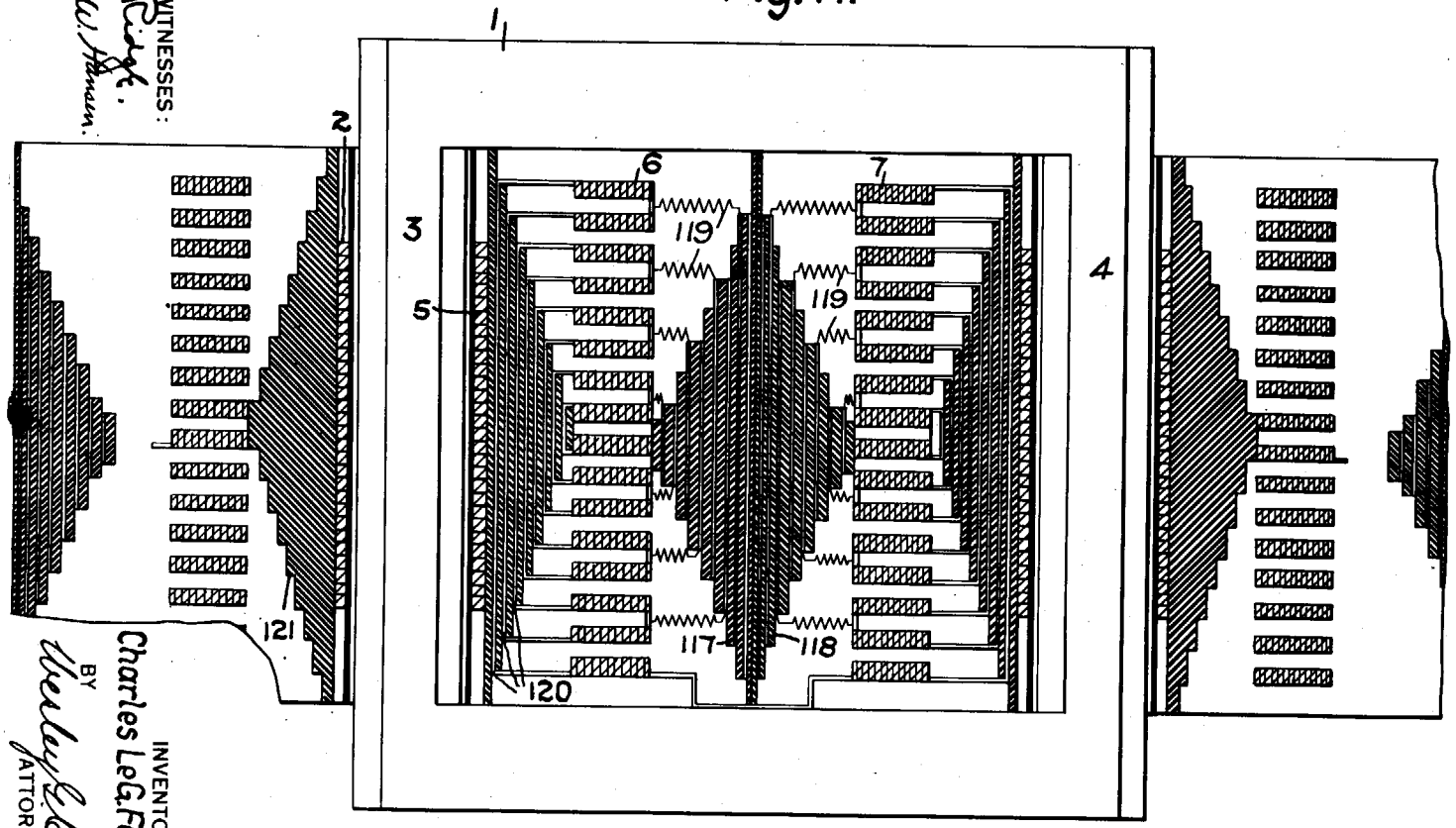
Figure 12:
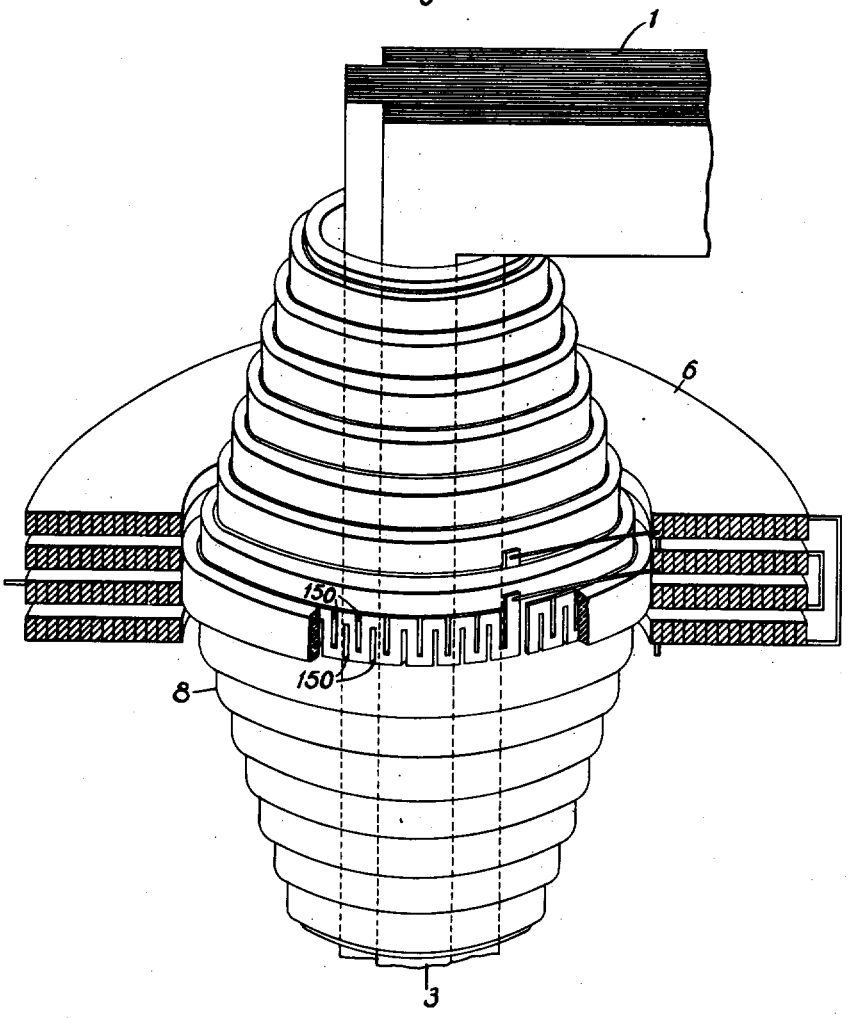
Figure 14:
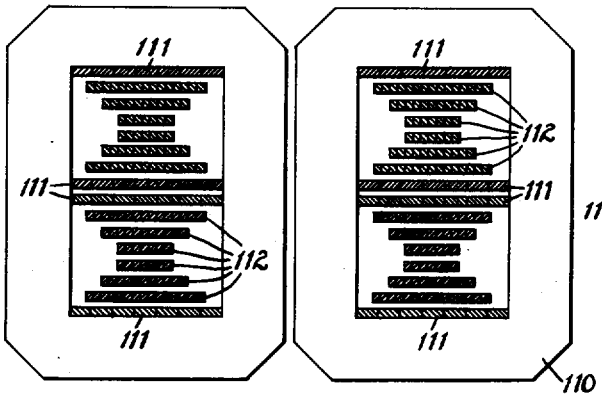
Figure 15:
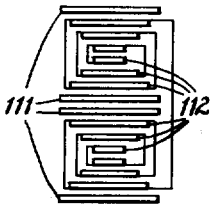
Figure 13:
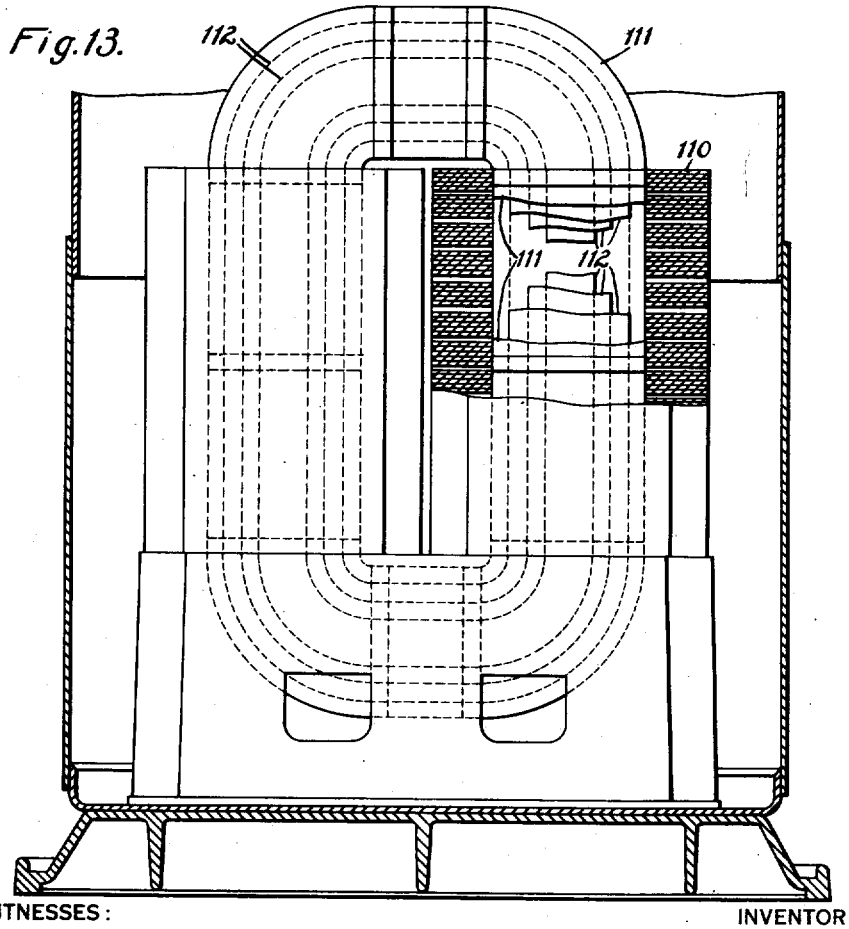

Figures 1 and 2 are, respectively, a sectional plan view and a side elevation of a transformer constructed in accordance therewith; Fig. 3 is a partially sectional view of the transformer core and windings shown in Fig. 2; Fig. 4 is a view corresponding to Fig. 3 in which insulating and conducting cylinders are disposed on all of the transformer core legs; Fig. 5 is a view of a three-phase transformer core and windings corresponding to Fig. 3, and Fig. 6 is a view, corresponding to Fig. 3, of a transformer having a divided secondary winding, one section being adjacent to the transformer core and the other section being outside the primary winding; Fig. 7 shows a modified system of connections for the high-potential coils of a transformer which is adapted for testing purposes when it is desired to ground one end of the winding and may also be used for groups of transformers which are star-connected, with their neutral point grounded on a three-phase circuit; Fig. 8 is a view of a transformer in which the winding is divided into four groups and is distributed on the four legs of a substantially square or rectangular core instead of on two legs, as is more usual; Fig. 9 illustrates an arrangement of transformer windings which is similar to Fig. 3 except that the insulating barriers between the two groups of high-potential windings are omitted; Fig. 10 is a view of a winding corresponding to Fig. 3, in which rings of conducting material are either embedded in the insulation or are located between insulating cylinders and are connected to intermediate points in the transformer winding, in place of the complete conducting cylinders of Fig. 3; Fig. 11 is a view of a transformer having insulation composed of a series of alternate layers of insulating and conducting materials, intermediate points in the transformer winding being connected to the conducting layers through external resistances; Fig. 12 is a perspective view of an insulating sleeve having conducting cylinders which are connected to intermediate points in the winding, as in Fig. 13, but are specially constructed to introduce resistance into the condenser or capacity circuit without the use of external resistances; Fig. 13 is a front elevation of a shell type transformer embodying my invention, certain of the parts being broken away to disclose the coils; Fig. 14 is a plan view of the core and windings shown in Fig. 13, and Fig. 15 is a diagrammatic view showing the circuit connections for the winding of Figs. 13 and 14.

Referring to Figs. 1, 2 and 3 of the drawings, the structure here illustrated comprises a substantially rectangular core 1, a low-potential winding 2 that is divided into two groups of coils which surround two opposite legs 3 and 4 of the core 1 and are separated therefrom by insulating sleeves 5, a high-potential winding composed of two groups 6 and 7 of relatively flat coils, insulating sleeves 8 and 9 located on the respective core legs, between the low and high-potential windings, and insulating barriers 10 and 11 that separate the high-potential windings from each other and from the walls of a tank or casing 12 in which the transformer is disposed. The core legs 3 and 4 may be of any suitable form but are preferably cruciform in cross-section in order to economize space and to reduce the mean length of turn in the winding. The insulating sleeves 8 and 9 are similar to each other and each preferably comprises a plurality of cylinders 13 of conducting material and insulating cylinders 14 which alternate therewith. The conducting cylinders are of graded-lengths, the longer ones being adjacent to the low-potential winding and the shorter ones adjacent to the high-potential winding. By this means, the surface distances between the conducting cylinders are made adequate to correspond to or to exceed the potential which the insulating cylinders are capable of withstanding.

It has been my aim to so arrange and connect the coils of the high-potential winding as to obtain a maximum separation between the high-potential coils and the core, the coils of lower-potential being disposed at shorter distances from the core member in order to utilize the space within the core member to a maximum degree. If the lowest-voltage coils of the high-potential winding are grounded, they may be located very close to the core structure, as shown in Fig. 2, but, if the potential difference between these coils and the core is liable to be great, they should be considerably removed from the core member. The circuit connections for the primary windings are clearly set forth in Figs. 2 and 3, to which special reference may now be had. As here shown, a connection may be completed from a high-potential external circuit through a conducting lead 15, which extends through a terminal bushing 16 and is connected at its inner end to a high-potential coil 17 of the winding. From this coil, a circuit is continued through the conducting cylinder 13[a] of largest diameter of the sleeve 8 to the inner turn of a coil 18. From the outer turn of this coil, a circuit is continued through the conducting cylinder 10[a] of smallest diameter of the barrier 10 to the outer end of coil 19. Circuit is similarly continued through coils 20, 21, 22, 23, 24, 25, 26, 27 and 28, the free terminal of coil 28 being grounded or connected to the outer turn of a coil 29 of the group 7. The circuit is completed through the coils of this group in the same way as it was completed through the coils of group 6, but in the reverse order, the lead 30 being finally brought out through a terminal bushing 31. By interconnecting the coils through the conducting cylinders, which are a part of the insulating sleeves, the strains imposed upon the insulation are distributed with substantial uniformity, irrespective of the areas of the conducting cylinders or the thickness of the insulating cylinders which separate them. In consequence thereof, a uniform electrostatic field is produced which is mapped out by equi-potential contour lines which constitute the exposed edges of the conducting cylinders of the insulating structure, the potentials of the cylinders being fixed at suitable values by connecting them to proper points on the distributed potential winding of the transformer, as indicated. This arrangement approximates the theoretically correct structure which would obtain if the whole surface of the dielectric or insulating structure were mapped out in equi-potential contour lines infinitely close together, the contour lines being conductors which are charged to the proper values by being connected to a source of potential, in this instance, the distributed potential winding of the transformer. The space occupied by the transformer may be materially reduced for a predetermined voltage, since each insulating cylinder may be called upon to resist a maximum potential without any tendency for adjacent insulating cylinders to be ruptured.

When the insulation is formed of a plurality of alternating concentric cylinders of insulating and conducting materials, condensers are obviously formed which may produce potential disturbances in the transformer winding, when the connections are effected as shown in Figs. 2 and 3, but these disturbances are slight, if not altogether absent, in transformers which are supplied with alternating current at ordinary commercial frequencies and if the wave form of the alternating current supplied to the windings is free from high harmonics. In any event, the disturbances may be obviously avoided by utilizing certain modified constructions which are hereinafter described. It is my intention to include the use of insulation of the so-called "condenser type" within the scope of my invention without limiting myself in this regard.

When a transformer is designed for very high voltage service, it may be found advantageous to provide insulating sleeves 32 and 33 on the transformer legs 34 and 35 as shown in Fig. 4 in order to increase the area of the conducting cylinders which are located adjacent to the core member, without enlarging the dimensions of the core member itself. The advantage secured in this manner depends upon the principle which renders condensers of equal capacity desirable for insulation of this type, the increased areas of the small conducting cylindrical members making possible a reduction in length for a given diameter. These sleeves are composed of conducting cylinders $32^a$ and $33^a$ which are electrically connected by conductors $32^b$ and $33^b$ to the corresponding cylinders $34^a$ and $35^a$ of the other legs and are separated by suitable insulation $32^c$ and $33^c$. Thus the conducting cylinders forming a part of the insulating structure on the four legs of the core member and nearest to them are interconnected, the next larger cylinders are similarly interconnected but independently of the others, etc., as clearly shown in Fig. 4.

The transformer illustrated in Fig. 5 comprises a core 36 having three parallel legs 37, 38 and 39, and low and high-potential windings disposed on each leg to constitute a three-phase transformer, each phase corresponding to one half of the winding shown in Fig. 3. This arrangement is well adapted for three-phase star-connected transformers having their neutral points grounded. The same arrangement of coils may be adapted for star-connected transformers, in which the neutral point is not grounded, by providing sufficient insulation between the high-potential coils and the core to withstand the voltage between one of the high-potential line conductors and the neutral point.

The structure shown in Fig. 4 may, of course, be adapted for use with high-potential polyphase transformers, and the low-potential windings shown in Fig. 3 may be divided into four groups, as shown in Fig. 6, instead of into two groups, a portion of the low-potential winding being disposed outside of the groups of high-potential windings, as well as inside of said groups. The advantages obtained from this arrangement are well known. When both ends of each of the transformer winding groups 6 and 7 are maintained at a relatively high-potential above the ground, the terminals $6^a$ and $7^a$ which are interconnected are carried away from the core member through bushings $6^b$ and $7^b$ as shown in Fig. 6, in order to avoid grounding.

Reference may now be had to Fig. 7, in which the two groups of high voltage windings are disposed substantially as they are in Fig. 3 of the drawings, but are so connected that one terminal is adapted to be maintained at a relatively low potential while the other is adapted for a very high potential. If a terminal 40 is assumed to be connected to a high-potential conductor, the coil 41 to which it is connected is connected, at its inner end, to a coil 42, the circuit being continued, through coils 43 and 44, to coil 45. The opposite end of coil 45 is connected, through one of the conducting cylinders of the insulating sleeve 9, to coil 46 which is connected direct to the coil 47, a circuit being continued in a similar manner from the coil of one group to a second coil of the same group, through a conducting cylinder, from thence directly to a coil of the other group, circuit again being continued through a conducting cylinder. The coils are successively connected, in the order of their reference numerals, from 41 to 60, inclusive. This arrangement is specially adapted for use in transformers having one terminal grounded or in transformers which are star-connected in groups of three, with their neutral point grounded. This arrangement may also be used for star-connected three-phase groups when the neutral is not grounded, provided the low-potential coil of the high-potential winding is properly insulated for the difference in potential between one circuit of the three-phase system and its neutral point.

Reference may now be had to Fig. 8, where the winding arrangement, in securing the desired distribution of potential, is such that the total amount of necessary insulating material is reduced to a very small quantity for high voltages, the space usually occupied by the insulation being occupied by additional transformer coils. A substantially square core member 61, having similar groups of low-potential and high-potential coils disposed on each of the four legs of the core is provided. One terminal of the transformer for the high-potential is connected to a coil 62 which is the outermost coil of one of the groups, from which coil, a circuit is continued through coils 63 to 81, inclusive, as indicated in Fig. 8.

The arrangement of Fig. 9 may be used when it is desired to omit the barriers between the groups of Fig. 3, the arrangement and connections of the coils being such as to permit of this modification. From a coil 82, a circuit is established through coils 83 to 109, inclusive, as indicated in Fig. 9.

In Fig. 10, the arrangement of transformer coils is shown which is similar to that of Fig. 3, but instead of the connections between coils being completed through the conducting cylinders which form a part of the insulating structure, a plurality of conducting rings 115, which may be embedded in an insulating bushing 116, are used. The rings are joined by conducting strips $115^a$ which form the circuit connections between coils and, consequently, the potential of each pair of rings is fixed, their location relative to the core member being determined by their potential. The rings are so connected to the transformer winding that the potential of each is fixed at a value which corresponds to the potential of the same surface in a field which would exist between the high potential ring and the core member if their parts were concentric conducting cylinders of infinite length. In other words, such a distribution of potential is established over the surfaces of the insulating body that extend between the parts to be insulated as will produce substantially the same static field or stress distribution as would exist if the said parts were cylinders of infinite length or other surfaces of infinite area. In the case of cylinders of infinite length, the field or stress distribution between them follows the logarithmic law, and it is in accordance with this law that the potentials of the conductors are fixed in the present instance. It will, of course, be understood that the law according to which the potentials of the conductors adjacent to the surfaces of the insulating body are fixed depends upon the shape of the surfaces of the parts to be insulated. For instance, the logarithmic law holds for concentric cylinders and the uniform law for parallel planes. With such an arrangement of parts, no conductor in the insulating structure has a definite capacity to any other conductor, but its capacity is a function of its own potential and those of the remaining conductors. Therefore, all distortion of the normal electric field is avoided and also the energy losses necessarily incident to such distortion which are manifested in original structures by the necessity of supplying charging currents. In other words, if the capacity of each cylinder is a function of its own potential and the potentials of the remaining cylinders, the necessity of supplying charging currents is avoided and the electric field is maintained uniform and undistorted. Consequently, the potential of each conductor in the insulating structure, as determined by its connection to the transformer winding cannot be changed by resonance with the inductance of any portion of the winding of the transformer, because such a change would at once cause a change in capacity, which would immediately destroy the requisite condition for resonance. By fixing the potential of the conductors or, in this case, the conducting cylinders the electrostatic field thus uniformly established is independent of external influences. The internal electrostatic field is maintained constant and independent of any external influences such as may arise by external electrically charged bodies, because, if external bodies could influence the internal field, the potentials of the conducting cylinders would have to vary, but they having a fixed potential, cannot be influenced and, therefore, the internal field is maintained invariable. The conducting rings may be located between insulating cylinders instead of being embedded in a body of insulation, as shown. The rings do not overlap but their edges preferably come directly opposite each other, in order to obtain the desired stress distribution in the insulation. It is evident that insulating structures similar to the bushing 116 may be adapted to other winding arrangements and to polyphase transformers such as those illustrated in other figures. It is evident that the conducting rings described above may be utilized in connection with any well known winding arrangement and that this type of insulation may be combined with other types and structures of insulation within the scope of my invention. For instance, in the transformer shown in Figs. 2 and 3, or in other figures, the spaced conductors forming a part of the insulating structure may be connected to such points of the winding as to produce substantially the same field distribution (logarithmic) as would exist if the outer cylinders were of infinite length. It is immaterial, so far as the attainment of this result is concerned, whether the conductors embodied in the insulation are cylinders extending throughout the length of the structure or rings at its ends only, so long as the said conductors determine the potentials upon the surfaces or boundaries of the insulating region in accordance with the logarithmic law. Since the potentials upon the surface of the insulating region are maintained constant, the effect of external bodies within the region inclosed by the surface is zero or negligible. The spaced conductors forming a part of the insulating structure, by being connected to such points of the winding as to produce substantially the same field distribution as would exist if the outer cylinders were of infinite length, render the charging currents negligible or substantially zero since the field is uniformly distributed.

Referring to Fig. 11, the structure here shown comprises a plurality of insulating sleeves or bushings which are similar to those of Fig. 9 except that additional barriers 117 and 118 are introduced between the two groups of transformer coils and between the groups in the tank. These barriers permit of a more compact arrangement. The conducting cylinders, of which the insulating sleeves are composed, are severally connected to intermediate points in the transformer windings through resistance sections 119. The connections between coils are completed through conducting strips 120, which are either embedded in insulating sleeves 121, as shown, or may be disposed between concentric insulating cylinders. By connecting the intermediate points in the winding to the conducting cylinders of the insulating sleeves through resistances, the thickness of the sleeves may be materially reduced, since an advantageous distribution of potential through the insulation is maintained without danger of injuring the insulation immediately surrounding the coils, voltage disturbances produced in the plates of the condenser being choked out by the resistances.

In Fig. 12, the conducting cylinders of the insulating sleeves are provided with slots 150 which are cut alternately from opposite ends in order to form a zig-zag path for the capacity current, thereby introducing a resistance which is non-inductive and which tends to prevent static disturbances in the same way that the external resistances 119 of Fig. 11 accomplish this result.

The insulating sleeves and bushings referred to hereinbefore are preferably constructed as set forth in Patent No. 858,385, granted July 2, 1907, to the Westinghouse Electric & Mfg. Company, as assignee of Emil Haefely, sheets of tin-foil, or other suitable conducting material, being interposed at convenient or desired intervals between the convolutions of insulating material, during the construction of the device.

Referring to Figs. 13, 14 and 15 of the drawings, a shell type transformer is here illustrated, comprising a core member 110, low-voltage coils 111 and high-voltage coils 112. The high-voltage coils are interposed between the low-voltage coils and are relatively narrow, being at the same time centrally located, relative to the adjacent walls of the core member, so that all the coils of the transformer have the same length of mean turn and are all concentric, while the high-voltage coils are separated from the core member in all directions and the low-voltage coils are adjacent to the core member, the circuit connections which I prefer being shown in Fig. 15.

The distribution of the static field within the insulating structure is determined, as before explained, in accordance with the potentials of the conductors that are embodied therein, which potentials are fixed by the connections of the conductors to the coils. The distribution of the static field external to the insulating structure, however, is determined by the voltage and spacings of the coils which are adjacent thereto. In other words, the potential of each coil determines the potential of a plane passing through it substantially normal to the core leg that is surrounded by it. Since the connections of the coils to the conductors constituting a part of the insulating structure determine the potentials of the corresponding cylindrical surfaces that surround the core and include the said conductors, and since the said conductors respectively terminate opposite to the coils to which they are connected, it will be seen that the ends of the insulating structure, or the ends of the region bounded by the said conductors, are shaped to substantially conform to the locus of the intersections of the substantially equipotential surfaces adjacent to the ends of the said structure.

Although most of the drawings illustrate windings applied to core type transformers, those skilled in the art will understand that they are equally applicable to shell type transformers and to other high-voltage structures, and I desire that modifications which do not depart from the spirit of my invention shall be included within its scope.

I claim as my invention:

1. The combination with a low potential body, and a relatively high potential winding comprising a plurality of coils, of an insulating structure interposed between said body and said winding and comprising alternate layers of insulating and conducting materials, the layers of conducting material being superposed and constituting parts of the connections between the coils of the winding.

2. The combination with a winding comprising a plurality of coils, of an adjacent insulating structure comprising alternate layers of insulating and conducting materials, the layers of conducting material being superposed and constituting parts of the connections between the coils of the winding.

3. The combination with a low potential body, and a relatively high potential winding comprising a plurality of coils, of an insulating member interposed between said body and said winding, and conductors adjacent to those surfaces of said member that extend between the said body and said winding constituting parts of the connections between the coils of the winding.

4. The combination with a magnetizable core and a winding comprising a plurality of coils, of an insulating sleeve separating the coils from the core and having a plurality of concentric conducting cylinders embedded in it, said conducting cylinders constituting portions of the electrical connections between the coils.

5. A transformer comprising a substantially rectangular core and a plurality of coils disposed end to end, in two groups, on opposite legs of the core, and insulating sleeves disposed between the coils and the core legs on which they are mounted, the coils being connected in a series of which the middle coils of the groups constitute the terminals.

6. A transformer comprising a core, a plurality of coils disposed thereon end to end, and an insulating sleeve separating the coils from the core, the connections between coils being completed through conductors embedded in the insulating sleeve.

7. A transformer comprising a core, an insulating sleeve surrounding a portion of the core, a plurality of coils disposed thereon end to end and connected in a series which successively includes the coils in the order of their separation from the portions of the core not surrounded by the coils, the connections between coils being completed through conductors embedded in the insulating sleeve.

8. A transformer comprising a core, a plurality of winding coils disposed thereon end to end to form a group, and an insulating sleeve separating the coils from the core, said sleeve comprising a series of concentric conducting cylinders graded in length according to their nearness to the core and separated from each other by insulation, and the middle coils of the winding group being connected through the conducting cylinders of largest diameter to form a series which is continued to the outer coils of the winding.

9. A transformer comprising a substantially rectangular core, two groups of coils disposed on the respective opposite legs of the core, insulating sleeves separating the coil groups from the core legs and insulating sleeves separating the coil groups from each other, each of said sleeves comprising alternate layers of conducting and insulating materials and said coils being interconnected through the agency of the conducting layers.

10. A transformer comprising a substantially rectangular core, a plurality of coils disposed end to end in two groups on the respective opposite legs of the core, insulating sleeves separating the coil groups from the core legs and insulating sleeves separating the coil groups from each other, each of said sleeves comprising alternate layers of conducting and insulating materials and the said coils being connected through the agency of the conducting layers to form a series having its terminals at the innermost coils of the respective groups.

11. A transformer comprising a core having a plurality of substantially parallel legs, low-voltage coils disposed thereon, insulating sleeves surrounding the low-voltage coils and groups of high-voltage coils surrounding the insulating sleeves, the coils of each group being arranged end to end and connected in series from the innermost to the outermost, and the outer coils of each group being connected together.

12. In a transformer, the combination with a magnetizable core and a winding therefor, of insulating means disposed between said core and said winding, and means constituting a part of the winding for rendering the distribution of stress in the insulation independent of the core member.

13. In electric apparatus, the combination with a magnetizable core and a winding therefor and an insulating structure disposed between said core and said winding, of means for effecting a distribution of stress in the insulation which corresponds to that existing in a uniform insulating medium between two concentric conducting cylinders of infinite length spaced at the same distance apart and having the same difference of potential as the winding and the core member.

14. In a transformer, the combination with a substantially rectangular core, two groups of coils disposed on the respective opposite legs of the core and an insulating structure comprising concentric cylinders of conducting material, separated by insulation, disposed between the groups of coils and the core legs, of similar insulating structures disposed on the core legs not occupied by the winding, the conducting cylinders of all of the insulating structures being interconnected according to their distance from the core.

15. In a transformer, the combination with a substantially rectangular core, two groups of coils disposed on one pair of opposite legs, and insulating sleeves or bushings comprising alternating concentric cylinders of insulating and conducting materials separating the coils from the core legs, of insulating sleeves disposed on the remaining pair of opposite core legs having alternating concentric cylinders of insulating and conducting materials, the conducting cylinders of the sleeves on core legs not occupied by the coils being electrically connected to the conducting cylinders separating the winding from the core legs to increase the effective area of the latter cylinders.

16. In a transformer, the combination with a substantially rectangular core and a plurality of coils disposed end to end on one pair of opposite core legs in two similar groups of insulating sleeves comprising a plurality of alternating cylinders of insulating and conducting materials surrounding the groups and separating them from each other, and sleeves or bushings comprising concentric cylinders of insulating and conducting materials, said coil groups being electrically connected by a conductor threaded through the insulating bushings or sleeves.

17. The combination with two conducting members, of an interposed insulating structure, and means for establishing a distribution of potential adjacent to the surfaces of the insulating structure that extend between said members to produce a distribution of the static field in the insulating structure that substantially corresponds to the distribution that would exist if the opposing surfaces of the conducting members were extended as far as possible or infinitely.

18. The combination with two conducting members, of an interposed insulating structure, conductors terminating adjacent to the portions of the surface thereof that extend between said members, and means for fixing the potentials of said conductors to produce a distribution of the static field in the insulating structure that substantially corresponds to the distribution that would exist if the opposing surfaces of the conducting members were extended as far as possible or infinitely.

19. The combination with two substantially cylindrical conducting members, of an interposed insulating structure and means for establishing a distribution of potential adjacent to the surfaces of the insulating structure that extend between said members to produce a distribution of the static field in the insulating structure that substantially corresponds to the distribution that would exist if the opposing surfaces of the conducting members were extended as far as possible or infinitely.

20. The combination with two substantially cylindrical conducting members, of an interposed insulating structure, conductors terminating adjacent to the portions of the surface thereof that extend between said members, and means for fixing the potentials of said conductors to produce a distribution of the static field in the insulating structure that substantially corresponds to the distribution that would exist if the conducting members were of infinite length.

21. The combination with two conducting members, of interposed insulating material, and conductors interspersed with the insulating material the potentials of which are severally fixed at substantially the same values as would exist at the same points if the opposing surfaces of said conducting members were extended in similar form as far as possible or infinitely.

22. The combination with two conducting members, of an interposed insulating structure, and conductors terminating adjacent to the portions of the surface thereof that extend between said members, the potentials of said conductors being severally fixed at substantially the same values as would exist at the same points if the opposing surfaces of the conducting members were extended in similar form as far as possible or infinitely.

23. The method of insulating two conducting members from each other which consists in fixing the potentials adjacent to the surface of an insulating structure that is interposed between the members at substantially the same values as would exist at the same points if the opposing surfaces of the conducting members were extended in similar form as far as possible or infinitely.

24. The method of insulating two conducting members from each other which consists in fixing the potentials of conductors adjacent to the surface of an insulating structure that is interposed between said members at substantially the same values as would exist at the same points if the opposing surfaces of the conducting members were extended in similar form as far as possible or infinitely.

25. An electrical device comprising a winding, an adjacent insulating structure that is tapered in opposite directions from an intermediate point, and conductors that terminate adjacent to the tapered faces of the structure and are connected to and included in circuit with the winding.

26. An electrical device comprising a plurality of series-connected coils, an adjacent insulating structure that is tapered in opposite directions from an intermediate point, and conductors that terminate adjacent to the tapered faces of the structure and constitute parts of the connections between the coils.

27. An electrical device comprising a plurality of side-by-side series-connected coils, the coils of higher potential being disposed intermediate those of lower potential, an adjacent insulating structure that is tapered in opposite directions from an intermediate point, and conductors that terminate adjacent to the tapered faces of the insulating structure and are connected to the coils.

28. An electrical device comprising an insulating structure that is tapered from an intermediate point toward its ends, a plurality of side-by-side series connected coils, the coils of higher potential being disposed adjacent to the intermediate portion of the insulating structure and also intermediate the coils of lower potential, and conductors that terminate adjacent to the tapered faces of the insulating structure and are connected to the coils.

29. A transformer comprising a plurality of side-by-side coils that are connected in a series beginning with intermediately located coils and ending with outer coils, an adjacent insulating structure that is tapered from an intermediate point toward its ends, and conductors that terminate adjacent to the tapered faces of the insulating structure and are connected to the coils.

30. An electrical device comprising a winding, an adjacent insulating structure having its ends similarly stepped, and conductors that terminate adjacent to the steps in the insulating structure and are respectively connected to intermediate points in the winding.

31. The combination with a conducting body having a certain electrical potential, of a conducting electrostatic field flow-line intercepter mounted adjacent thereto, and means for so fixing the potential distribution on the surface of said intercepter that the electrostatic field between said body and said intercepter and in the vicinity of said body is maintained invariable and independent of influences arising from charged bodies beyond said intercepter.

32. In an electrical device, the combination with a plurality of side-by-side coil-sections, of insulating structures respectively within and without the coil-sections each comprising spaced conductors, and connections between the coil-sections including the said conductors.

33. In an electrical device, the combination with a plurality of side-by-side coils that are connected in a series beginning with the centrally located coils and successively including the next outermost coils, of insulating structures respectively within and without the coils each comprising spaced conductors, the connections between the coils alternately including conductors of the respective insulating structures.

34. In an electrical device, the combination with a plurality of side-by-side series connected coils, of insulating structures respectively within and without the coils each comprising spaced conductors, the connections between the coils alternately including conductors of the respective insulating structures.

35. An insulating structure comprising inner and outer conducting sleeves, an interposed insulating body the end faces of which are similarly tapered between the said sleeves, and spaced conductors terminating adjacent to the tapered faces of the said body.

36. The combination with two terminal members having different electrical potentials, of a plurality of conducting electrostatic field flow-line intercepters therebetween which are electrically charged to different potentials, said intercepters being severally so associated with said terminal members that the charging current of the latter is substantially negligible.

37. An electrical device comprising a winding, a member surrounded thereby, an insulating structure interposed between the winding and said member, and spaced conductors in the insulating structure that constitute parts of the said winding.

38. In an electrical device, the combination with a core comprising a coil-receiving portion and other portions extending transversely thereto, of a plurality of connected coils surrounding the said coil-receiving portion of the core, the coils of higher potential relatively to the core being more remote from the transversely extending portions of the core than the coils of lower potential.

39. In an electrical device, the combination with a plurality of side-by-side coils, of an insulating structure adjacent to the coils, and conductors that terminate adjacent to the ends of the insulating structure and are connected to the coils, the conductors being respectively opposite to the coils to which they are connected.

40. In an electrical device, the combination with a plurality of side-by-side coils, of an insulating structure adjacent to the coils, and conductors that terminate adjacent to the ends of the insulating structure and are connected to and included in circuit with the coils, the conductors being respectively opposite to the coils to which they are connected.

41. The combination with two terminal members having different electrical potentials, of a plurality of conducting electrostatic field flow-line intercepters therebetween which are electrically charged to different potentials, each of said terminal members being so associated with a selected intercepter as to produce a distribution of the electrostatic field in the vicinity of said terminal member that substantially corresponds to the distribution that would exist if the opposing surfaces of the intercepter and its associated terminal member were extended as far as possible or infinitely.

42. The combination with a plurality of side-by-side spaced coils, of an adjacent insulating structure of gradually diminishing thickness from an intermediate point toward its ends, and spaced conductors that terminate adjacent to the tapered faces of the structure and are connected to the coils, the said conductors being respectively opposite to the coils to which they are connected.

43. The combination with a plurality of side-by-side spaced coils, of an adjacent insulating structure of gradually diminishing thickness from an intermediate point toward its ends, and spaced conductors that terminate adjacent to the tapered faces of the structure and are connected to, and included in circuit with, the coils, the said conductors being respectively opposite to the coils to which they are connected.

44. The combination with a plurality of side-by-side spaced coils, of an adjacent insulating structure having steps corresponding to the spacing of the coils, and conductors that terminate adjacent to the steps in the insulating structure and are respectively connected to the corresponding opposite coils.

45. The combination with a plurality of coils, of an adjacent insulating structure having a face inclined relatively to the axis of the coils, and spaced conductors that terminate adjacent to the inclined face of the insulating structure and are connected to, and included in circuit with, the coils.

46. The combination with a plurality of side-by-side spaced coils, of an adjacent insulating structure having a face inclined relatively to the axis of the coils, and spaced conductors that terminate adjacent to the inclined face of the insulating structure and are connected to the coils, the said conductors being respectively opposite to the coils to which they are connected.

47. The combination with a plurality of side-by-side spaced coils, of an insulating sleeve having its end portions inclined relatively to its axis, and spaced conductors that terminate adjacent to the inclined faces of the sleeve and are connected to the coils, the said conductors being respectively opposite to the coils to which they are connected.

48. The combination with two conducting members, of an insulating structure interposed between said members the surfaces of said structure that extend between said members being shaped to substantially conform to the locus of the intersections of the equipotential surfaces adjacent to said members.

49. The combination with two conducting members, of an interposed insulating structure, and spaced conductors terminating adjacent to those surfaces of said structure that extend between said members, the ends of the region bounded by the said conductors being shaped to substantially conform to the locus of the intersections of the substantially equi-potential surfaces adjacent thereto.

50. The combination with two conducting members, of an interposed insulating structure, and spaced conductors terminating adjacent to those surfaces of said structure that extend between said members, the surfaces determined by the ends of the conductors being shaped to substantially conform to the locus of the intersections of the substantially equi-potential surfaces adjacent thereto.

51. In an electrical device, the combination with a plurality of spaced coils that are connected in a series of beginning with the centrally located coils and successively including the next outermost coils, the coils of higher potential being disposed intermediate the coils of lower potential, and the coils being spaced apart in accordance with their differences of potential, of an adjacent insulating structure, and conductors that are adjacent to the ends of the insulating structure and are connected to and included in circuit with the coils, the conductors terminating respectively opposite to the coils to which they are connected.

52. In an electrical device, the combination with a plurality of spaced coils that are connected in a series beginning with the centrally located coils and successively including the next outermost coils, the coils of higher potential being disposed intermediate the coils of lower potential, and the coils being spaced apart in accordance with their differences of potential, of an adjacent insulating structure having a face inclined relatively to the axis of the coils, and spaced conductors adjacent to the inclined face of the insulating structure and connected to the coils, the said conductors respectively terminating opposite to the coils to which they are connected.

53. An electrical device comprising a plurality of spaced connected coils, the coils of higher potential being interposed between those of lower potential, and the coils of intermediate potential being spaced from the high and low potential coils in accordance with their differences of potential therefrom, and an insulating structure adjacent to the coils and having conductors adjacent to its ends that are connected to the coils, the said conductors respectively terminating opposite to the coils to which they are connected.

54. The combination with a body having a certain electrical potential, of an envelop therefor, and means for so fixing the electrical potential distribution on the surface of said envelop that the electrostatic field internally thereof and in the vicinity of the enveloped body is maintained invariable and independent of influences arising from charged bodies external to the envelop.

55. The combination with a plurality of elements having different electrical potentials of a plurality of metallic envelops therefor, and means for charging each of said envelops to such a potential that an electrostatic field within each metallic envelop and in the vicinity of its associated element is permanently independent of any external electrically charged body.

56. The combination with a distributed potential winding, of metallic envelops charged to fixed electrical potentials of different values, said envelops being so paired with selected portions of said winding as to protect said selected winding portions associated with the properly charged envelops from the influences of external electrical charges.

57. The combination with a plurality of elements having different mean electrical potentials, of metallic envelops charged to fixed potentials of different values, each of said envelops being so paired with a selected element as to maintain the electrostatic field in the vicinity of said element independent of influences arising from electrically charged bodies external to said envelop.

58. The combination with a plurality of elements having different mean electrical potentials, of metallic envelops therefor having potentials of different values, each of said envelops being paired with a selected element, the potential of the envelop of each pair being such that an electrostatic field in the vicinity of its associated element is permanently maintained independent of electrical influence arising from bodies external to the envelop.

59. The combination with a distributed potential winding, of members electrically charged to different and fixed potentials associated therewith, the said charged members being severally associated with selected portions of the winding in order that the charging currents of the portions of said windings so associated with the said charged members are substantially negligible.

60. The combination with a plurality of elements having different electrical potentials, of a plurality of metallic envelops therefor which are electrically charged to different potentials, said elements being severally so associated with the metallic envelops that the charging currents of the former are substantially negligible.

61. The combination with a plurality of elements having different electrical potentials, of a plurality of metallic envelops therefor, and means for electrically charging each metallic envelop to such potential that the charging currents of the elements severally associated with said envelops are substantially negligible.

62. The combination with a plurality of elements having different potentials, of a plurality of metallic envelops therefor which are electrically charged to different potentials, each of said elements being severally so associated with a selected metallic envelop as to produce a distribution of the electrostatic field in the vicinity of said element that substantially corresponds to the distribution that would exist if the opposing surfaces of the envelop and its associated element were extended as far as possible or infinitely.

63. The combination with a plurality of elements having different mean electrical potentials, of a plurality of metallic envelops therefor which are electrically charged to different potentials, the elements being severally and selectively so paired with the metallic envelops as to produce a distribution of the electrostatic field in the vicinity of each element that substantially corresponds to the distribution that would exist if the opposing surfaces of each pair of elements and envelops were extended as far as possible or infinitely.

64. The combination with an electrical winding comprising a plurality of elements having different mean electrical potentials, of conducting cylinders severally concentric with the separate elements, and means for fixing the potentials of said cylinders to produce a distribution of the electrostatic field in the vicinity of the elements that substantially corresponds to the distribution which would exist if the opposing surfaces of the pairs of cylinders and elements were extended as far as possible or infinitely.

65. The combination with a distributed potential winding comprising elements that are connected in series relationship and have different mean electrical potentials, of conducting cylinders severally concentric with the separate elements, the potentials of said cylinders being fixed at substantially the same values as would exist at the points occupied by them if opposing surfaces of each pair of conducting cylinders and elements were extended in similar form as far as possible or infinitely.

66. The combination with an electrical winding comprising a plurality of distributed potential elements, of conducting cylinders associated with said separate elements, each of said cylinders being fixedly charged to the same potential as its associated element of the electrical winding in order to produce a distribution of the static field surrounding each element that corresponds to the distribution which would exist if the opposing surfaces of each conducting cylinder and its associated element were extended infinitely or as far as possible.

67. The combination with an electrically distributed potential winding comprising a plurality of separate elements that are charged to different mean potentials, of conducting cylinders concentric therewith, each conducting cylinder being fixedly charged to such potential that the distribution of the electrostatic field within the cylinder and in the vicinity of its associated element substantially corresponds to the distribution that would exist if the opposing surfaces of the pairs of conducting cylinders and elements were extended as far as possible or infinitely.

In testimony whereof, I have hereunto subscribed my name this 26th day of April, 1916.

CHARLES LE G. FORTESCUE.